US012623263B2

(12) United States Patent      (10) Patent No.:    US 12,623,263 B2

Wataya et al.                   (45) Date of Patent:       May 12, 2026

(54) WASTE-PLASTIC OIL CONVERSION DEVICE

(71) Applicants: AGRI CULTURE KARUIZAWA CO., LTD., Nagano (JP); WATAYA SEISAKUSHO CO., LTD., Nagano (JP)

(72) Inventors: Kenichi Wataya, Nagano (JP); Tomonori Wataya, Nagano (JP); Hideaki Koda, Nagano (JP); Toshiyasu Koda, Nagano (JP)

(73) Assignees: AGRI CULTURE KARUIZAWA CO., LTD., Nagano (JP); WATAYA SEISAKUSHO CO., LTD., Nagano (JP)

( * ) Notice: Subject to any disclaimer, the term of this patent is extended or adjusted under 35 U.S.C. 154(b) by 279 days.

(21) Appl. No.: 18/556,090

(22) PCT Filed: Nov. 30, 2021

(86) PCT No.: PCT/JP2021/043866

§ 371 (c)(1),
(2) Date: Oct. 19, 2023

(87) PCT Pub. No.: WO2023/032240

PCT Pub. Date: Mar. 9, 2023

(65) Prior Publication Data

US 2024/0207912 A1     Jun. 27, 2024

(30) Foreign Application Priority Data

Aug. 30, 2021    (JP) ................................ 2021-140035

(51) Int. Cl.
    B09B 3/40          (2022.01)
    B01D 5/00          (2006.01)
           (Continued)

(52) U.S. Cl.
CPC .............. B09B 3/40 (2022.01); B01D 5/0057 (2013.01); B01D 5/009 (2013.01); B09B 3/70 (2022.01);

(Continued)

(58) Field of Classification Search
CPC .............. B09B 3/40; C10B 53/07; C10G 1/10
See application file for complete search history.

(56) References Cited

U.S. PATENT DOCUMENTS

2007/0187224 A1    8/2007   Yoshimura
2023/0241655 A1 *   8/2023   Sasai ......................... B09B 3/40
                                        110/341

FOREIGN PATENT DOCUMENTS

JP      2005-200538 A     7/2005
JP      2016-190177 A     11/2016
WO    WO-2020218341 A1 *   10/2020   ............. H10F 71/00

OTHER PUBLICATIONS

English machine translation of WO 2020/218341 (Year: 2020).*

(Continued)

*Primary Examiner* — Renee Robinson
(74) *Attorney, Agent, or Firm* — HAUPTMAN HAM, LLP

(57) ABSTRACT

A waste-plastic oil conversion device includes a primary decomposition tank that generates a decomposition gas by melting waste plastic; a secondary decomposition tank that generates a low boiling point decomposition gas by heating a liquefied component generated by condensing a high boiling point component out of the decomposition gas generated by the primary decomposition tank at a temperature lower than a temperature in the primary decomposition tank; a melting tank that melts a plastic material that forms a solar battery panel so as to separate the plastic material into the plastic material and a valuable material; and a first storage tank that condenses and stores the decomposition (Continued)

gas and the low boiling point decomposition gas therein. The melting tank is connected to the primary decomposition tank so as to introduce the decomposition gas into the melting tank.

11 Claims, 5 Drawing Sheets

(51) Int. Cl.
  *B09B 3/70*          (2022.01)
  *C10B 53/07*          (2006.01)
  *C10G 1/10*          (2006.01)
  *B09B 101/15*          (2022.01)
  *B09B 101/75*          (2022.01)
(52) U.S. Cl.
  CPC ................ *C10B 53/07* (2013.01); *C10G 1/10* (2013.01); *B09B 2101/15* (2022.01); *B09B 2101/75* (2022.01)

(56)            References Cited

OTHER PUBLICATIONS

English machine translation of JP 2016-190177 (Year: 2016).*
International Search Report of PCT/JP2021/043866, mailed Jan. 18, 2022, 4pp.

* cited by examiner

WASTE-PLASTIC OIL CONVERSION DEVICE

RELATED APPLICATIONS

The present application is a National Phase of International Application No. PCT/JP2021/043866 filed Nov. 30, 2021, which claims priority to Japanese Application No. 2021-140035 filed Aug. 30, 2021.

TECHNICAL FIELD

The present invention relates to a waste-plastic oil conversion device (a device for converting waste plastic into oil).

BACKGROUND ART

The treatment of waste plastic that contains plastic such as plastic products that are wasted after being used and plastic residues that are generated in a manufacturing process of plastic products has now become an environment task to be jointly solved world-widely. Further, recently, as a power generation system that does not emit carbon dioxide, a photovoltaic generation system has been rapidly becoming popular. However, in future, it is predicted that solar battery panels that have reached the duration time or solar battery panels or the like that are broken due to a hazard or the like will be generated in large quantity. Accordingly, the establishment of a treatment method which imparts a small environmental load to the solar battery panels has been urgently requested.

From a viewpoint of the effective utilization of a resource, there has been proposed a waste-plastic oil conversion device that collects and reuses a liquefied component that is generated by condensing a decomposition gas generated at the time of heating and melting waste plastic in a decomposition tank, that is, an oil component. Such a waste-plastic oil conversion device includes: a decomposition tank that heats and decomposes waste plastic; a supply unit that supplies the waste plastic to the decomposition tank; an oil conversion treatment unit (for example, a condensing tank) that collects and condenses a decomposition gas generated in the decomposition tank (for example, see patent literature 1).

On the other hand, in general, a solar battery panel is treated as a waste after an outer frame and glass are removed manually. In view of the above, as a method for treating the solar battery panel, there has been proposed a method of collecting valuable materials by chemically decomposing and removing a plastic material for holding solar battery cells or the like of the solar battery panel. This method of treating the solar battery panel is a method where an oxide semiconductor is brought into contact with a back sheet of the solar battery panel, and under the presence of oxygen, plastic materials such as the back sheet, a filler, a sealing material are decomposed and removed at a temperature at which an oxide semiconductor forms a true electric conductor region. Then, after the plastic materials are decomposed and removed, valuable materials such as inter connectors, the solar battery cells, the outer frame, glass and the like are collected (for example, see patent literature 2). In the description made hereinafter, assume that waste plastic includes the plastic materials such as the back sheet, the filler and the sealing material.

CITATION LIST

Patent Literature

Patent Literature 1: JP-A-2005/200538
Patent Literature 2: JP-A-2016/190177

SUMMARY OF INVENTION

Technical Problem

The waste-plastic oil conversion device described in the above-mentioned patent literature 1 can collect and reuse an oil component (generated oil) that is generated by condensing a decomposition gas that is generated by heating and melting waste plastic in the decomposition tank. However, to thermally decompose waste plastic in the decomposition tank, pretreatment such as crushing, washing and drying of a waste becomes necessary. Accordingly, the treatment in a state where the outer frame (frame), glass of the solar battery panel are held and the treatment of a large-sized article that cannot be crushed become difficult to perform.

On the other hand, the treatment device of the solar battery panel described in patent literature 2 can decompose and remove plastic materials such as the back sheet, the filler, the sealing material that constitute the solar battery panel. However, a decomposition gas that is generated when the back sheet, the filler, the sealing material and the like are decomposed, is decomposed into water and carbon dioxide due to a reaction between the decomposition gas and oxygen, and water and carbon dioxide are discharged to the outside. That is, although the valuable materials such as the interconnectors, the solar battery cells, the outer frame, and the glass can be collected, it is impossible to collect a liquefied decomposition gas from the plastic materials such as the back sheet, the filler and the sealing material.

Further, the waste-plastic oil conversion device and the treatment device of the solar battery panels described above differ from each other in a treatment method, a management temperature and a device configuration and hence, it is difficult to handle the waste-plastic oil device and the treatment device of the solar battery panel simply as one device. Further, in a case where the waste-plastic oil conversion device and the treatment device of the solar battery panel are simply formed into one device, it is necessary to provide a heat source to a decomposition tank and an electric furnace respectively and hence, there arises a drawback that energy consumption is increased.

The present invention has been made to overcome such a drawback, and it is an object of the present invention to realize a waste-plastic oil conversion device that can collect a liquefied component by generating a decomposition gas through thermal decomposition of waste plastic with low energy consumption, and can collect valuable materials from the solar battery panel.

Solution to Problem

[1] A waste-plastic oil conversion device according to the present invention includes: a primary decomposition tank that generates a decomposition gas by melting waste plastic; a secondary decomposition tank that generates a low boiling point decomposition gas by heating a liquefied component generated by condensing a high boiling point component out of the decomposition gas generated by the primary decomposition tank at a temperature lower than a temperature in the primary decomposition tank; a melting tank that melts a plastic material that forms a solar battery panel so as to separate the plastic material into the plastic material and a valuable material; and a first storage tank that condenses and stores the decomposition gas and the low boiling point decomposition gas therein, wherein the melting tank is connected to at least one of the primary decomposition tank or the secondary decomposition tank, and is configured to introduce the decomposition gas or the low boiling point decomposition gas into the melting tank.

[2] In the waste-plastic oil conversion device according to the present invention, it is preferable that the waste-plastic oil conversion device further include a separation tower that is disposed between the primary decomposition tank and the secondary decomposition tank, the separation tower configured to separate the decomposition gas generated by the primary decomposition tank into the decomposition gas of the low boiling point introduced into the secondary storage tank and the liquefied component introduced into the secondary decomposition tank.

[3] In the waste-plastic oil conversion device according to the present invention, it is preferable that the secondary decomposition tank include a meshed partition wall that separates an inside of the secondary decomposition tank into a region that is connected to the separation tower and a region that is connected to at least one of the first storage tank or the melting tank, and a catalyst be disposed on a bottom portion on a lower side than the partition wall and on an upper surface of the partition wall.

[4] In the waste-plastic oil conversion device according to the present invention, it is preferable that the melting tank include: a support plate capable of mounting the solar battery panel thereon; a door capable of sealing the melting tank, and being openable and closeable so as to allow insertion and taking out of the solar battery panel into and from the melting tank; and a heater for maintaining the melting tank at a predetermined temperature.

[5] In the waste-plastic oil conversion device according to the present invention, it is preferable that the melting tank include an injection unit capable of injecting the liquefied component of a low boiling point stored in the secondary storage tank into an inside of the melting tank in a shower like manner.

[6] In the waste-plastic oil conversion device according to the present invention, it is preferable that the door have a duplicated structure forming a space therein, the melting tank include a nitrogen gas supply unit that supplies a nitrogen gas into the space, and the space be maintained at a pressure higher than an atmospheric pressure by the nitrogen gas during an operation of the melting tank.

[7] In the waste-plastic oil conversion device according to the present invention, it is preferable that the melting tank be configured to inject the cooled nitrogen gas into the melting tank from the nitrogen gas supply unit after an operation of the melting tank is finished.

[8] In the waste-plastic oil conversion device according to the present invention, it is preferable that the support plate include: a meshed support plate that separates the valuable material that forms the solar battery panel and the molten plastic material; and a lattice-like support plate capable of mounting the meshed support plate and the solar battery panel thereon and having a plurality of through holes.

[9] In the waste-plastic oil conversion device according to the present invention, it is preferable that the support plate further include a rack capable of arranging the solar battery panels disposed adjacently to each other in a state a gap is formed between the solar battery panels in an inside of the melting tank.

[10] In the waste-plastic oil conversion device according to the present invention, it is preferable that the support plate be configured to mount the solar battery panel thereon, be configured to move in an inside of the melting tank, and be configured to move a residue of the solar battery panel to a position where the residue is recovered after thermal decomposition of the solar battery panel.

[11] In the waste-plastic oil conversion device according to the present invention, it is preferable that the melting tank be configured to allow introducing of the waste plastic having a large size that cannot be introduced to the first decomposition tank.

Advantageous Effects of Invention

In the waste-plastic oil conversion device, the waste-plastic is melted in the primary decomposition tank thus generating a decomposition gas of a high boiling point. The plastic materials that form the solar battery panels are melted in the melting tank and hence, a decomposition gas is generated and valuable materials are separated. A decomposition gas or a low boiling point decomposition gas capable of melting the plastic materials is supplied to the melting tank from the primary decomposition tank or the secondary decomposition tank. Further, the molten plastic materials are introduced into the primary decomposition tank from the melting tank, and the molten plastic materials are reheated together with the waste-plastics melted by the primary decomposition tank thus generating a decomposition gas of a high boiling point. The waste-plastic oil conversion device has the configuration that allows a heat exchange between the primary decomposition tank, the secondary decomposition tank and the melting tank. The waste-plastic oil conversion device having such a configuration can thermally decompose the waste plastic with low energy consumption, and can generate a decomposition gas by thermally decomposing the waste plastic, and can recover the decomposition gas in the form of the liquefied component and hence, valuable materials can be recovered from the solar battery panels. The above-mentioned liquefied component becomes a generated oil that can be effectively used.

MODE FOR CARRYING OUT THE INVENTION

Figure 1:
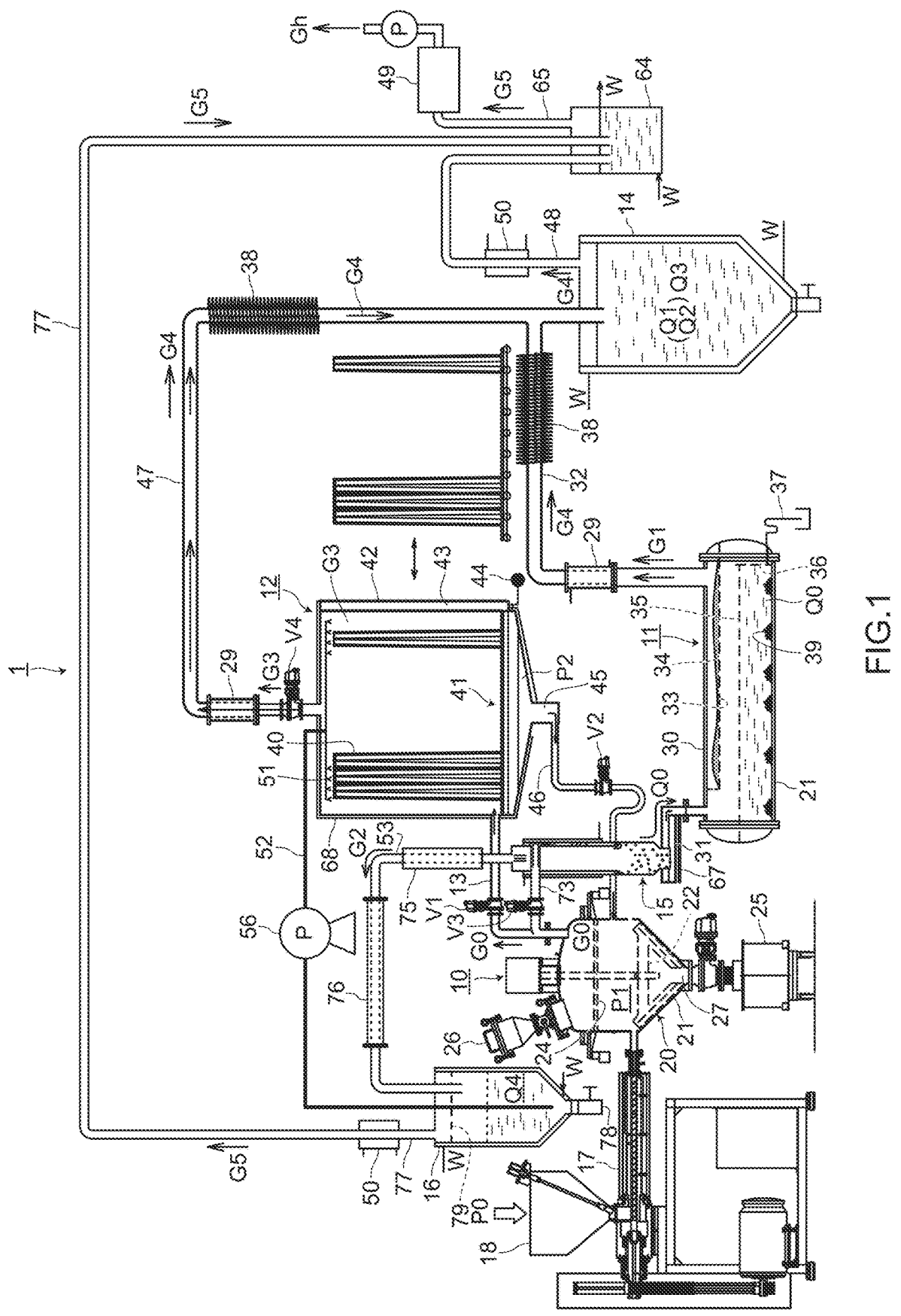
FIG. 1 is a configurational explanatory view illustrating the overall configuration of a waste-plastic oil conversion device 1 according to a first embodiment.

Hereinafter, a waste-plastic oil conversion device 1, a waste-plastic oil conversion device 2, and a waste-plastic oil conversion device 3 according to the embodiments of the present invention are described with the reference to FIG. 1 to FIG. 6. In the description made hereinafter, there may be a case where the waste-plastic oil conversion device 1, the waste-plastic oil conversion device 2, and the waste-plastic oil conversion device 3 are also described as the oil conversion device 1, the oil conversion device 2, and the oil conversion device 3 in a simplified manner. In the oil conversion devices 1, 2, 3, waste plastic P0 which is an oil conversion target is a plastic product wasted after being used, a residue of plastic generated in a step of manufacturing plastic products and the like. As a material of waste plastic P0, for example, thermoplastics such as polystyrene, polypropylene, polyethylene, Styrofoam (foamed styrene), polyethylene terephthalate (PET), and vinyl chloride can be named.

The configuration of the solar battery panel 40 is described with reference to FIG. 4. As plastic materials used for forming the solar battery panel 40, a filler 81, a back sheet 84, a sealing material 88 and the like are named. As the filler 81, ethylene vinyl acetate copolymer (EVA), polyvinyl butyral (PVB), a silicon resin and the like are used. A plastic material used as the back sheet 84 is made of polyvinyl fluoride (PVF), polyethylene terephthalate (PET), polyethylene (PE) or the like. Further, as the sealing material 88, isobutylene-isoprene rubber (IIR), silicone rubber or the like is used. In the description made hereinafter, the filler 81, the back sheet 84, and the sealing material 88 are collectively referred to as plastic materials.

First Embodiment

FIG. 1 is a configurational explanatory view illustrating the overall configuration of the oil conversion device 1 according to the first embodiment. The oil conversion device 1 includes: a primary decomposition tank 10 that generates a decomposition gas G0 (also referred to as an off-gas) by heating and melting waste plastic P0 that is a raw material; and a secondary decomposition tank 11 that generates a low boiling-point decomposition gas G1 by heating liquefied component Q0 obtained by condensing the decomposition gas G0 at a predetermined temperature. The oil conversion device 1 includes a melting tank 12 that generates a decomposition gas G3 by melting plastic materials of the solar battery panels 40. The melting tank 12 is connected to the primary decomposition tank 10 by a connecting pipe 13 so that the decomposition gas G0 having a high temperature that is formed in the primary decomposition tank 10 can be introduced into the melting tank 12.

The oil conversion device 1 includes a first storage tank 14. The first storage tank 14 stores: a liquefied component Q1 obtained by condensing a decomposition gas G4 after the low boiling point decomposition gas G1 generated in the secondary decomposition tank 11 passes a temperature control unit 29; and a liquefied component Q2 obtained by condensing the decomposition gas G4 after the decomposition gas G3 generated in the melting tank 12 passes a temperature control unit 29. The first storage tank 14 stores a liquefied component Q3 in the form that the liquefied component Q1 and the liquefied component Q2 are present in mixture.

Between the primary decomposition tank 10 and the secondary decomposition tank 11, a separation tower 15 and a secondary storage tank 16 are disposed. The separation tower 15 separates a decomposition gas G2 having a low boiling point from the decomposition gas G0 generated by the primary decomposition tank 10. The secondary storage tank 16 condenses and stores the decomposition gas G2 separated from the separation tower 15. A liquefied component Q0 obtained by condensing the decomposition gas G0 at the time of separating the decomposition gas G2 in the separation tower 15 is introduced into the secondary decomposition tank 11.

The oil conversion device 1 includes a pusher 17. The pusher 17 supplies waste plastic P0 that is a raw material charged from a hopper 18 into the primary decomposition tank 10 while heating and melting the waste plastic P0. Although not illustrated in the drawing, the pusher 17 is a so-called screw type pusher that is formed of: a heating sleeve where a heater (a band heater or the like) is disposed on an outer periphery of a heating sleeve; and a screw that is rotated in the heating sleeve.

The primary decomposition tank 10 includes: a body portion 20 having a bottom portion that is formed in a conical shape; a heater 21 disposed on an outer periphery of the body portion 20; and a stirrer 22 that stirs molten plastic P1 obtained by heating and melting in the body portion 20. The body portion 20 is disposed on an upper portion of a base platform 25. The heater 21 is, for example, an infrared heater, a high frequency coil or a heating wire. The stirrer 22 has a function of equalizing a temperature of molten plastic P1 by stirring molten plastic P1, a function of scraping a residue of molten plastic P1 adhering to a bottom portion of the body portion 20. A temperature sensor (not illustrated in the drawing) that detects a temperature is disposed in the body portion 20, and properly controls an inner temperature by controlling electricity supplied to the heater 21. The temperature in the primary decomposition tank 10 falls within a range of from 400° C. to 500° C.

A partition plate 24 having a net shape on which a catalyst is carried is disposed above the stirrer 22. The catalyst is, for example, high-silica zeolite, and promotes the further decomposition of the decomposition gas G0. A charging portion 26 through which a catalyst such as zeolite is charged in the body portion 20 is mounted on an upper portion of the body portion 20. In the body portion 20, zeolite promotes the thermal decomposition of molten plastic P1 by fluid catalytic decomposition.

A residue discharging port 27 for discharging molten plastic P1 and a residue of zeolite is formed in a bottom portion of the body portion 20. Although not illustrated in drawing, the body portion 20 may include a vent for releasing a decomposition gas G0 to the outside when a pressure in the body portion 20 becomes a predetermined value or more. It is desirable to mount a filter for removing harmful substances, particles and the like on the vent.

The secondary decomposition tank 11 includes a cylindrical body 30 disposed horizontally (not necessarily "accurately horizontal"). One end portion of the cylindrical body 30 is connected to the separation tower 15 by a connecting pipe 31, and the other end portion of the cylindrical body 30 is connected to the first storage tank 14 by a connecting pipe 32. The temperature control unit 29 is disposed on the connecting pipe 32 on a secondary decomposition tank 11 side. Further, a cooling unit 38 is disposed on the connecting pipe 32 on a first storage tank 14 side. The low boiling point decomposition gas G1 is cooled by the temperature control unit 29, and is condensed by the first storage tank 14 as the decomposition gas G4, and the liquefied component Q1 is stored in the first storage tank 14. The secondary decomposition tank 11 includes a first meshed partition wall 33 that separates the secondary decomposition tank 11 into a region that is connected to the separation tower 15 (connecting pipe 31) and a region that is connected to the first storage tank 14

(connecting pipe 32). A catalyst 34 is disposed on an upper surface of the first partition wall 33 in a state where the catalyst 34 allows a gas to pass therethrough.

The catalyst 34 promotes the generation of the low boiling point decomposition gas G1 from the decomposition gas G0 that is mixed into the liquefied component Q0 introduced from the separation tower 15. The cylindrical body 30 has a second meshed partition wall 35 that divides the cylindrical body 30 into upper and lower portions, and an overflow weir 36 that reaches a bottom portion is formed on the second partition wall 35 in the vicinity of a connecting portion between the connecting pipe 32 and the cylindrical body 30. The second partition wall 35 plays a role of preventing bumping of the liquefied component Q0. In the region that is connected to the separation tower 15, a heater 67 is disposed so as to prevent the coagulation of the liquefied component Q0.

In the secondary decomposition tank 11, when an amount of liquefied component Q0 is increased so as to exceed a generation amount of the low boiling point decomposition gas G1, the liquefied component Q0 overflows the overflow weir 36, and is discharged through the discharge pipe 37. That is, the overflow weir 36 functions as a safety valve that prevents the cylindrical body 30 from being filled with the liquefied component Q0. Further, a catalyst 39 is disposed on a bottom portion of the cylindrical body 30. High-silica zeolite or the like is used as the catalyst 39, and the catalyst 39 promotes the generation of the low boiling point decomposition gas G1 from the liquefied component Q0. Although not illustrated in the drawing, a temperature sensor is disposed in the cylindrical body 30, and properly controls an inner temperature by controlling electricity supplied to the heater 21. An internal temperature of the secondary decomposition tank 11 is controlled to a temperature that falls within a range of from 300° C. to 400° C.

Figure 4:
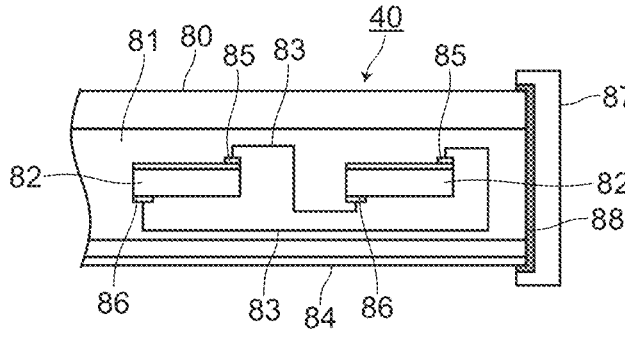
FIG. 4 is an explanatory view schematically illustrating one example of the configuration of the solar battery panel 40.

The melting tank 12 melts the plastic materials such as a filler 81, a back sheet 84, a sealing material 88 of the solar battery panel 40 (see FIG. 4). The melting tank 12 includes: a support plate 41 on which the solar battery panels 40 can be mounted; a door 42 that can hermetically close the inside of the melting tank 12 and is opened at the time of charging or discharging the solar battery panel 40; and a heater 68 that heats the melting tank 12 to a predetermined temperature. The heater 68 is disposed on an outer peripheral surface on the melting tank 12 except for the door 42.

The door 42 has a double wall structure where a space 43 is formed between the walls. A nitrogen gas supply portion 44 that supplies a nitrogen gas is connected to the space 43. In a state where the melting tank 12 is operated, the space 43 is filled with a nitrogen gas, and a pressure in the space 43 is controlled such that the pressure is higher than an atmospheric pressure. A nitrogen gas is filled in the space 43 for preventing the intrusion of air into the melting tank 12 and for increasing a heat insulation effect by not providing a heater 68 to the door 42.

The melting tank 12 is connected to the primary decomposition tank 10 by the connecting pipe 13. A valve V1 is mounted on the connecting pipe 13. By releasing the valve V1 during the operation of the melting tank 12, a decomposition gas G0 having a high temperature is introduced into the melting tank 12 from the primary decomposition tank 10. In the melting tank 12, a temperature of the decomposition gas G0 is controlled to a temperature that falls within a range of from 320° C. to 350° C. so that plastic materials of the solar battery panels 40 are melted.

The plastic materials that constitute the solar battery panels 40 can be sufficiently melted at a temperature of approximately 300° C. However, by setting the temperature in the melting tank 12 to a temperature that falls within a range of from 320° C. to 350° C., a melting time of the plastic materials can be shortened. Under this temperature condition, a low-boiling-point decomposition gas G1 is generated in the melting tank 12. On the other hand, by setting the temperature in the melting tank 12 to a temperature that falls within a range of from 400° C. to 500° C. in the same manner as the primary decomposition tank 10, a melting speed of the plastic materials can be further increased. However, a decomposition gas G0 is generated under this temperature condition.

A bottom portion of the melting tank 12 has a pyramidal funnel shape, and a hole portion 45 formed on a funnel-shaped vertex portion is connected to the primary decomposition tank 10 by a connecting pipe 46. A valve V2 is mounted on the connecting pipe 46 at an intermediate position between the melting tank 12 and the primary decomposition tank 10, and the valve V2 is closed when the operation of the melting tank 12 is stopped. The plastic materials melted by heating in the melting tank 12 (also referred to as a molten plastic P2) fall at a point of time that the molten plastic P2 obtains fluidity, is supplied to the primary decomposition tank 10 through the connecting pipe 46, and is reheated in the primary decomposition tank 10. In the melting tank 12, high-boiling-point component of the decomposition gas G0 is liquefied, and is supplied to the primary decomposition tank 10 together with the molten plastic P2. The molten plastic P2 is reheated at a temperature of 400° C. to 500° C. in the primary decomposition tank 10 together with the molten plastic P1, and a generated decomposition gas G0 is introduced into the melting tank 12.

In the melting tank 12, a decomposition gas G3 is generated. The decomposition gas G3 is a mixed gas formed of the low-boiling-point decomposition gas G1 that is generated during melting of the plastic materials of the solar battery panels 40 and the decomposition gas G0 generated in the primary decomposition tank 10. The decomposition gas G3 may be the low-boiling-point decomposition gas G1, the low-boiling-point mixed gas, the decomposition gas G0 or the low-boiling-point decomposition gas G1. The melting tank 12 and the first storage tank 14 are connected to each other by a connecting pipe 47. The temperature control unit 29 is disposed on a melting tank 12 side, and cools the decomposition gas G3 to 300° C. The decomposition gas G4 at a temperature of a boiling point of 300° C. or below is further cooled by the cooling unit 38 that is disposed on a first storage tank 14 side, and is condensed in the first storage tank 14 and is stored as a liquefied component Q2. Accordingly, in the first storage tank 14, a liquefied component Q3 where the liquefied component Q1 generated by condensing the low-boiling-point decomposition gas G1 generated in the secondary decomposition tank 11 and the liquefied component Q2 generated by condensing the low-boiling-point decomposition gas G3 generated in the melting tank 12 exist in a mixed form is stored. The first storage tank 14 is cooled to a normal temperature by cooling water W. When the melting tank 12 is not being operated, the valves V1, V2, V4 are closed, and the valve V3 is opened. At this point of time, in the first storage tank 14, the liquefied component Q1 that is made of a light oil component obtained by condensing the low-boiling-point decomposition gas G1 generated in the secondary decomposition tank 11 (the decomposition gas G4 cooled by the temperature control unit 29) is stored.

A decomposition gas G5 of a low-boiling-point that is not liquefied in the first storage tank 14 is fed to a water sealing unit 64 through a connecting pipe 48. The decomposition gas G5 is a volatile combustible gas that contains ethane, methane or the like where n is 5 or less in a molecular formula. Cooling water W is stored in the water sealing unit 64. A distal end of the connecting pipe 48 is immersed in the cooling water W, the decomposition gas G5 is not dissolved in the cooling water W and floats in a space formed above a liquid surface, and is discharged from a discharge pipe 65.

A height of the water surface is held at a fixed value. The main role of the water sealing unit 64 is to set a pressure in a system ranging from the primary decomposition tank 10 to the first storage tank 14 through the melting tank 12 and the secondary decomposition tank 11 to a positive pressure. With such a configuration, it is possible to prevent oxygen from intruding into the system ranging from the primary decomposition tank 10 to the first storage tank 14 through the melting tank 12 and the secondary decomposition tank 11.

The distal end of the connecting pipe 48 is constantly below the water surface and hence, a pressure at the distal end of the connecting pipe 48 is equal to a water pressure below the water surface of the connecting pipe 48. In a case where the distal end of the connecting pipe 48 is excessively deeper than the water surface, a pressure in the primary decomposition tank 10, and a pressure in the secondary decomposition tank 11 become high and hence, the decomposition efficiency of a decomposition gas G0 and a low-boiling-point decomposition gas G1 is lowered. In view of the above, in the water sealing unit 64, the water surface is held at a constant level, and an immersing depth of the connecting pipe 48 is set to approximately 10 mm. Further, by positioning the distal end of the connecting pipe 48 below the liquid surface, it is possible to prevent air from intruding the system ranging from the primary decomposition tank 10 to the first storage tank 14 when a temperature of the system is lowered due to the occurrence of any defect.

Further, with the provision of the water sealing unit 64, it is possible to prevent the reverse flow of the decomposition gas G4 to the secondary decomposition tank 11, and the melting tank 12, and the primary decomposition tank 10. A trap tank (omitted from the drawing) may be disposed between the first storage tank 14 and the water sealing unit 64. By providing the trap tank, a reverse flow prevention effect of the decomposition gas G2 is enhanced.

The decomposition gas G5 is introduced into a discharge gas decomposition treatment device 49 through a discharge pipe 65. The discharge gas decomposition treatment device 49 is a device that decomposes the decomposition gas G5 into a carbon oxide gas and water (water vapor) using a catalyst, and discharges the carbon oxide gas and water to the outside as a discharge gas Gh. The decomposition gas G5 can be discharged after the incineration is performed by an incinerator or the like. Next, the configuration of the melting tank 12 is further described with reference to FIG. 2A and FIG. 2B.

Figures 2A, 2B:
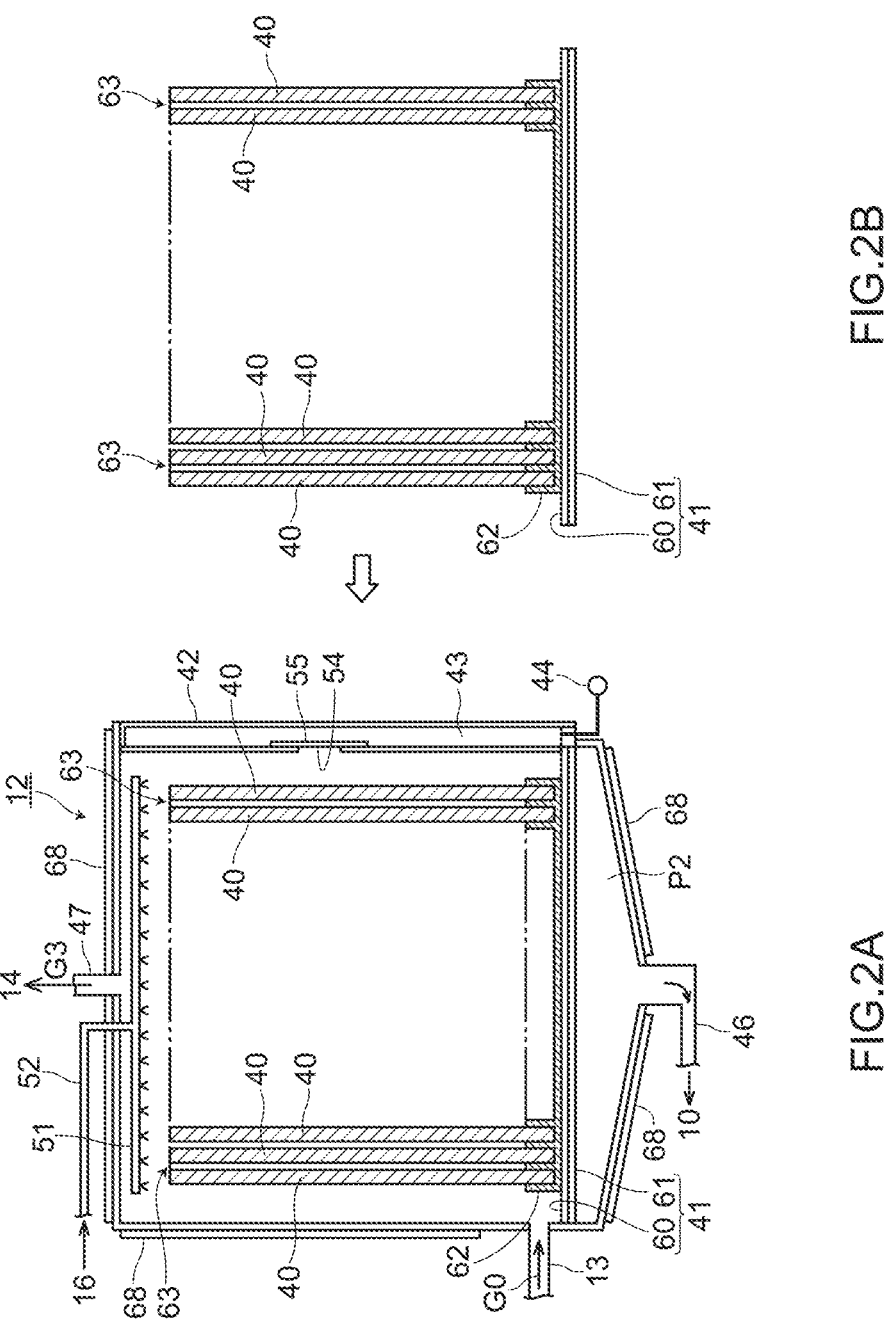
FIG. 2A and FIG. 2B are explanatory views illustrating a state of a melting tank 12 and solar battery panels 40 that are inserted into or taken out from the melting tank 12.

FIG. 2A and FIG. 2B are explanatory views illustrating a state of the melting tank 12 and the solar battery panels 40 that are inserted into or are taken out from the melting tank 12. FIG. 2A is an explanatory view illustrating a state of the melting tank 12. FIG. 2B is an explanatory view illustrating a state before the solar battery panel 40 is inserted into the melting tank 12. FIG. 2A and FIG. 2B are drawn in a state where the number of the solar battery panels 40 disposed inside and outside of the melting tank 12 and the shape of the rack 62 are omitted. The door 42 of the melting tank 12 has a hole portion 54 through which a cooled nitrogen gas can be injected into the inside of the melting tank 12. Immediately before taking out a remaining residue by stopping the operation of the melting tank 12, a cooled nitrogen gas is injected into the melting tank 12 through the hole portion 54 so as to speedily cool the melting tank 12, the support plate 41 and the residue of the solar battery panel 40. A shutter 55 that opens/closes the hole portion 54 is mounted on the door 42. The shutter 55 is closed when the melting tank 12 is being operated, and is opened after checking that the operation of the melting tank 12 is stopped and a temperature in the melting tank 12 is lowered to a predetermined temperature or below. A cooled nitrogen gas may be directly injected into the inside of the melting tank 12 without by way of the door 42.

The support plate 41 includes a meshed support plate 60 that has meshes for separating valuable materials that are a residue of a plastic material of the solar battery panels 40 and a molten plastic P2 when the plastic material is melted. The support plate 41 is formed of a lattice-like support plate 61 having a plurality of through holes (not illustrated in the drawing) capable of holding the meshed support plate 60 and a plurality of solar battery panels 40. The meshed support plate 60 retains the valuable materials and makes the molten plastic P2 fall down. The lattice-like support plate 61 has rigidity allowing the lattice-like support plate 61 to support the solar battery panel 40.

Further, the melting tank 12 has the rack 62 for holding a posture of the solar battery panels 40 on the support plate 41. The rack 62 arranges the solar battery panels 40 one by one in a vertical posture (referred to as the vertical arrangement), and the solar battery panels 40 are held in a state where a gap 63 is formed between the solar battery panels 40 disposed adjacently to each other. The solar battery panels 40 may be partially brought into contact with each other to an extent that the solar battery panels 40 are not brought into close contact with each other in the rack 62. By forming the gap 63 between the solar battery panels 40 disposed adjacently to each other, it is possible to bring the decomposition gas G0 into contact with the periphery of the solar battery panels 40 and hence, melting of the plastic materials that form the solar battery panels 40 can be promoted.

Although not illustrated in the drawings, in the inside of the melting tank 12, rails are disposed on both sides of the support plate 41 in an advancing and retracting direction, and the support plate 41 is movable on these rails in a slidable manner. Further, it is possible to move the support plate 41 on the rails by mounting rollers on the support plate 41. It is preferable to make the support plate 41 stand by at the same height as the above-mentioned rails outside the melting tank 12.

The melting tank 12 includes an injection unit 51 that is disposed at an upper portion of the melting tank 12. The injection unit 51 injects, like a shower, a liquefied component Q4 of a low boiling point that is stored in the secondary storage tank 16. The description of the melting tank 12 is described also with reference to FIG. 1. The injection unit 51 is connected to the secondary storage tank 16 through a connecting pipe 52 by way of a pump 56. The pump 56 pumps up the liquefied component Q4 from the secondary storage tank 16, and injects, like a shower, the liquefied component Q4 from the injection unit 51 by increasing a pressure of the liquefied component Q4 thus cooling the inside of the melting tank 12 and to clean a residue in the melting tank 12 and the solar battery panels 40. The secondary storage tank 16 is connected to the separation tower 15 by a connecting pipe 53. The liquefied component Q4 stored in the secondary storage tank 16 is mainly a gasoline. A meshed plate 79 is disposed at an upper portion of the secondary storage tank 16. The meshed plate 79 plays a role of a filter for minute particles or the like contained in the decomposition gas G2. Subsequently, the configuration of the separation tower 15 is described with reference to FIG. 3.

Figure 3:
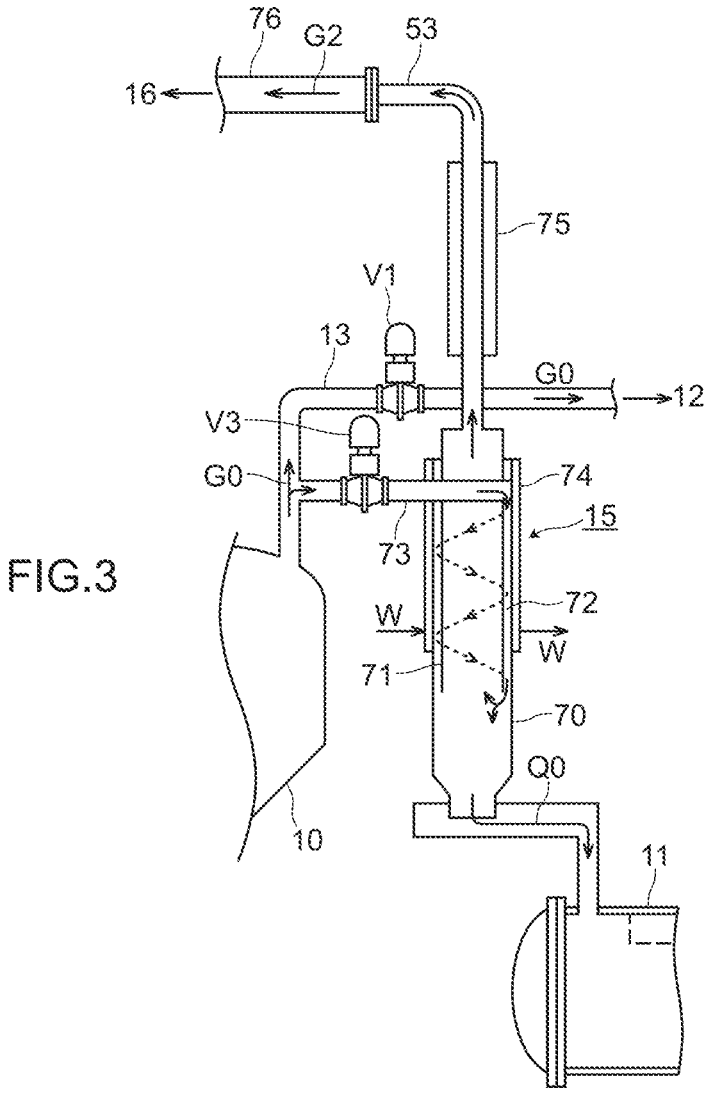
FIG. 3 is a cross-sectional view illustrating the configuration of a separation tower 15.

FIG. 3 is a cross-sectional view illustrating the configuration of the separation tower 15. The separation tower 15 is described also with reference to FIG. 1. The separation tower 15 is formed of: an outer cylindrical portion 70; and an inner cylindrical portion 71 that is inserted into the outer cylindrical portion 70. A cylindrical space 72 is formed between the outer cylindrical portion 70 and the inner cylindrical portion 71. The inner cylindrical portion 71 is connected to a primary decomposition tank 10 by a connecting pipe 73. The outer cylindrical portion 70 has a duplicate pipe structure, and cooling water W flows through an inner portion so as to cool a decomposition gas G0 supplied from the primary decomposition tank 10 to a temperature of 250° C. A valve V3 is disposed on the connecting pipe 73.

The decomposition gas G0 generated in the primary decomposition tank 10 is bifurcated into the connecting pipe 13 and the connecting pipe 73. The decomposition gas G0 is supplied to the melting tank 12 through the connecting pipe 13, and is supplied to the separation tower 15 through the connecting pipe 73. At the time of operating the melting tank 12, the valve V3 is closed and the valves V1, V2, V4 are released. When the liquefied component Q0 remains in the secondary decomposition tank 11, the secondary decomposition tank 11 is also operated. In a case where the melting tank 12 is not operated, the valves V1, V2, V4 are closed and the valve V3 is released. In a case where both the secondary decomposition tank 11 and the melting tank 12 are operated, valves V1, V2, V3, V4 are released. However, in the case where the melting tank 12 is operated, it is preferable to close the valve V3 for increasing thermal efficiency of the melting tank 12.

In the separation tower 15, the decomposition gas G0 is cooled to a temperature of 250° C. The decomposition gas G2 having a boiling point lower than 250° C. rises in the connecting pipe 53, and is supplied toward the secondary storage tank 16. The decomposition gas G0 having a boiling point higher than 250° C. (the decomposition gas G0 in which a decomposition gas G2 component is decreased) flows toward a downward side through a space 72 as the liquefied component Q0, and is supplied to the secondary decomposition tank 11. The decomposition gas G0 supplied to the separation tower 15 from the connecting pipe 73 impinges on an inner peripheral surface of the outer cylindrical portion 70 by flowing toward in an oblique direction of the inner peripheral surface (an approximately tangential direction of the inner peripheral surface), and falls in the space 72 while swirling along the inner peripheral surface (indicated by a dotted line in FIG. 3). With such a configuration, a cooling effect of the decomposition gas G0 is increased and hence, liquefying of the liquefied component Q0 is promoted and the liquefied component Q0 falls in the secondary decomposition tank 11.

A cooling unit 75 is disposed in the connecting pipe 53 on a separation tower 15 side, and a temperature adjustment unit 76 is disposed on the connecting pipe 53 on a secondary storage tank 16 side. The decomposition gas G2 is cooled to a temperature of 190° C. by the cooling unit 75, and is supplied to the secondary storage tank 16 while maintaining a temperature of 190° C. by the temperature adjustment unit 76. The liquefied component Q0 liquefied by the cooling unit 75 falls in the separation tower 15 and is supplied to the secondary decomposition tank 11, and the liquefied component Q0 is reheated in the secondary decomposition tank 11.

Returning to FIG. 1, the configuration ranging from the separation tower 15 to the secondary storage tank 16 is described. The decomposition gas G2 is cooled to a room temperature by the cooling water W in the secondary storage tank 16. A decomposition gas G5 that is not liquefied in the secondary storage tank 16 is introduced into a water shield unit 64 through a connecting pipe 77. A cooling unit 50 is disposed in the connecting pipe 77, and the cooling unit 50 maintains the decomposition gas G5 at a room temperature (20° C.), and introduces the decomposition gas G5 into the water sealing unit 64. By cooling the decomposition gas G5 to a room temperature by the cooling unit 50, a discharge amount of the decomposition gas G5 supplied to the water sealing unit 64 can be reduced. Subsequently, the configuration of the solar battery panel 40 that is a treatment object is described with reference to FIG. 4.

FIG. 4 is an explanatory view schematically illustrating one example of the configuration of the solar battery panel 40. The solar battery panel 40 is formed of: a glass plate 80; solar battery cells 82 fixed to one surface of the glass plate 80 by a filler 81; an inter connector 83 that is electrically connected between the solar battery cell 82 and the solar battery cell 82; and a back sheet 84 that protects a back surface side of the solar battery panel 40. Electrodes 85, 86 are formed on a front surface and a back surface of the solar battery cell 82. The inter connector 83 is a wiring that is connected between the solar battery cell 82 and the solar battery cell 82 via the electrodes 85, 86 and is connected to an external interface (not illustrated in the drawing). As the glass plate 80, a white plate heat treated glass (normally referred to as a reinforced glass being used). With respect to the filler 81, an ethylene vinyl acetate (EVA) resin, polyvinyl butyral (PVB) resin, a silicon resin and the like are used as representative materials. By applying a heat and a pressure to the filler 81, the filler 81 performs sealing such that no gap is formed between peripheries of the solar battery cells 82, an inner surface of the glass plate 80 and an inner surface of the back sheet 84.

As the solar battery cell 82, single crystal silicon, polycrystal silicon, thin film silicon, hetero-bonding and multiple-element compound semiconductor and the like are named. As the back sheet 84, a sheet made of polyethylene terephthalate (PET), polyethylene (PE), polyfluoride vinyl (PVF) and the like are used. Further, in the solar battery panel 40 having a large size, an outer flame 87 made of aluminum is fitted on the periphery of the solar battery panel 40. The solar battery panel 40 and the outer flame 87 are fixed to each other by the sealing material 88 so as to maintain a connecting portion between the solar battery panel 40 and the outer flame 87 in an airtight manner. Butyl rubber, silicone rubber or the like is used as a sealing material 88. The filler 81, the back sheet 84 and the sealing material 88 may be made of a thermoplastic resin.

When the solar battery panel 40 is heated in the melting tank 12, the plastic materials such as the filler 81, the back sheet 84, the sealing material 88 and the like are melted (these members being collectively referred as molten plastic P2). The molten plastic P2 is made to fall from a support plate 141 and is supplied to the primary decomposition tank 10. After all of the above-mentioned plastic materials are melted, a residue such as the outer flame 87, the glass plate 80, the solar battery cells 82, the inter connectors 83 and the like remains on the upper portion of the meshed support plate 60. The residue becomes valuable materials that can be used again as resources. The solar battery panel 40 may be housed in the melting tank 12 in a state where the outer flame 87 is removed from the solar battery panel 40.

Subsequently, with reference to the FIG. 1 to FIG. 4, the method of recovering the liquefied components Q1, Q2, Q3 from the waste plastic P0 and the plastic materials used in the solar battery pack 40 is described. The decomposition gas G0 generated in the primary decomposition tank 10 is cooled at a temperature of 250° C. in the separation tower 15 that forms a first path and, further, is condensed by the cooling unit 75, and is introduced into the secondary decomposition tank 11 as the liquefied component Q0. In the secondary decomposition tank 11, the liquefied component Q0 is heated at a temperature of 300° C. to 400° C. In a case where the temperature in the secondary decomposition tank 11 is set to 300° C., in the secondary decomposition tank 11, from the liquefied component Q0 having high boiling point where n is 17, 18, 19 in a molecular formula ($CnH_2n+_2$) of a hydrocarbon, a low boiling point decomposition gas G1 where n is 16 or less is generated. The liquefied component Q0 is mainly a heavy oil component, and is deposited on a lower side of the secondary decomposition tank 11 in a liquid state.

In the secondary decomposition tank 11, the liquefied component Q0 is thermally decomposed by heating the deposited liquefied component Q0 at a temperature of 300° C. to 400° C. thus generating the low boiling point decomposition gas G1. The residue of the liquefied component Q0 is far smaller in amount compared to the residue in the primary decomposition tank 10, and is discharged from the discharge pipe 37 of the secondary decomposition tank 11. In the liquefied component Q0, minute particles generated in the primary decomposition tank 10 are mixed. The minute particles are gravitationally deposited in the secondary decomposition tank 11, and are discharged from the discharge pipe 37 together with the liquefied component Q0 that is excessively stored in the primary decomposition tank 11. The discharge pipe 37 can function as a safety device that prevents the occurrence of a phenomenon that the liquefied component Q0 is excessively deposited in the secondary decomposition tank 11.

The low boiling point decomposition gas G1 generated in the secondary decomposition tank 11 is supplied toward the first storage tank 14 in a state where a temperature of the low boiling point decomposition gas G1 is held at 300° C. by the temperature control unit 29. Then, the temperature of the low boiling point decomposition gas G1 is lowered by the cooling unit 38, is condensed by the first storage tank 14, and the liquefied component Q1 is stored in the first storage tank 14. The liquefied component Q1 that contains the low boiling point decomposition gas G1 is mainly a light oil component.

In a case where the operation of the secondary decomposition tank 11 is stopped and the melting tank 12 is operated, the decomposition gas G0 at a temperature ranging of from 400° C. to 500° C. generated in the primary decomposition tank 10 is supplied to the melting tank 12. However, the temperature in the melting tank 12 is controlled to a temperature that falls within a range of from 320° C. to 350° C. Accordingly, the plastic materials such as the filler 81, the back sheet 84 and the seal member 88 of the solar battery panel 40 are melted, thus generating the decomposition gas G3 in which the decomposition gas G0 of a high boiling point and the low boiling point decomposition gas G1 exist in mixture. The decomposition gas G3 is cooled to 300° C. by the temperature control unit 29 and, further, the temperature of the decomposition gas G3 is lowered by the cooling unit 38, is condensed at a room temperature of 20°

C. by the cooling water W in the first storage tank 14, and is stored as the liquefied component Q2. The liquefied component Q2 is mainly a light oil component. The above describes the case where the melting tank 12 is operated without operating the secondary decomposition tank 11.

In the case where both the secondary decomposition tank 11 and the melting tank 12 are simultaneously operated, the liquefied component Q3 where the liquefied component Q1 and the liquefied component Q2 exist in mixture is stored in the first storage tank 14. In a case where the liquefied component Q3 stored in the first storage tank 14 is recovered as a useful generated oil, the liquefied component Q3 is heated to a boiling temperature of a desired liquefied component (oil component) so as to condense the liquefied component Q3 whereby a generated oil having desired component can be recovered.

The oil conversion device 1 according to the present embodiment described heretofore includes: the primary decomposition tank 10 that generates a decomposition gas G0 by melting the waste plastic P0; the secondary decomposition tank 11 that generates a low boiling point decomposition gas G1 by heating the liquefied component Q0 generated by condensing a high boiling point component out of the decomposition gas G0 generated by the primary decomposition tank 10 at a temperature lower than a temperature in the primary decomposition tank 10; and the melting tank 12 that melts the plastic materials such as the fillers 81, the back sheet 84 and the sealing material 88 that form the solar battery panel 40 so as to separate the plastic material into the plastic material and the valuable materials. Further, the oil conversion device 1 also includes the first storage tank 14 that condenses and stores the decomposition gas G0 and the low boiling point decomposition gas G1 therein. The melting tank 12 is connected to the primary decomposition tank 10 or the secondary decomposition tank 11 and is configured to introduce the decomposition gas G0 into the melting tank 12.

According to the oil conversion device 1 that has such a configuration, it is possible to melt the waste plastic P0, to generate the decomposition gas G0, and to recover the liquefied component Q2. Further, it is possible to melt the filler 81, the back sheet 84, the sealing material 88 and the like that form the solar battery panel 40, and separates and recovers the valuable materials that can be used as resources again such as the glass plates 80, the solar battery cells 82, the inter connectors 83 and the outer frames 87. Further, in the oil conversion device 1, by introducing the decomposition gas G0 generated by the primary decomposition tank 10 into the melting tank 12, it is possible to use the energy that such a decomposition gas G0 possesses as thermal energy for melting the solar battery cell 40. Still further, it is possible to reheat the plastic materials that are melted by the melting tank 12 (molten plastic P2) in the primary decomposition tank 10 thus generating the decomposition gas G0. In this manner, according to the waste plastic oil conversion device 1, with the low energy consumption, it is possible to generate the decomposition gas G3 by thermally decomposing the waste plastic P0 and to recover the decomposition gas G3 as the liquid component Q2 and hence, the valuable materials can be recovered from the solar battery panels 40.

The oil conversion device 1 is disposed between the primary decomposition tank 10 and the secondary decomposition tank 11. The oil conversion device 1 includes the separation tower 15 capable of separating the decomposition gas G0 into the decomposition gas G2 having a low boiling point that is introduced into the secondary storage tank 16, and the liquefied component Q0 that is introduced into the secondary decomposition tank 11.

The decomposition gas G2 is condensed and is stored in the secondary storage tank 16 as the liquefied component Q4. The liquefied component Q4 is gasoline, and can be used for cooling and cleaning the melting tank 12. Further, the liquefied component Q4 can be recovered as gasoline. The liquefied component Q4 cleans the inside of the melting tank 12 and valuable materials separated from the inside of the melting tank 12 and the solar battery panel 40 and, thereafter, is supplied to the primary decomposition tank 10 together with the residue after cleaning through the connecting pipe 46 and is reheated thus generating the decomposition gas G0, and the decomposition gas G0 is introduced into either one of the secondary decomposition tank 11 or the melting tank 12.

The secondary decomposition tank 11 has the meshed first partition wall 33 that separates the inside of the secondary decomposition tank 11 into a region that is connected to the separation tower 15 and a region connected to the first storage tank 14. The catalyst 39 is disposed on a bottom portion on a side below the first partition wall 33, and the catalyst 34 is disposed on an upper surface of the first partition wall 33.

With the use of the catalyst 34, it is possible to promote the generation of the low-boiling point decomposition gas G1 from the decomposition gas G0 that exists in the liquefied component Q0 in mixture and is introduced from the separation tower 15. Further, the catalyst 39 promotes the generation of the low-boiling point decomposition gas G1 from the liquefied component Q0.

Further, the melting tank 12 includes: the support plate 41 that is capable of mounting the solar battery panels 40 thereon; the door 42 that is capable of sealing the melting tank 12 and is capable of being opened or closed for inserting or taking out the solar battery panels 40; and a heater 68 that controls a temperature in the melting tank 12 at a predetermined temperature that falls within a range of from 320° C. to 350° C.

The melting tank 12 includes the door 42, and is configured to seal the inside of the melting tank 12. The melting tank 12 includes the heater 68. A temperature control of the inside of the melting tank 12 is performed by sealing the inside of the melting tank 12 and by heating using the heater 68. By providing such a configuration to the melting tank 12, even in a case where the melting tank 12 has a volume capable of storing the solar battery panels 40, a melting efficiency of the plastic materials that form the solar battery panels 40 can be increased. Further, the melting tank 12 is sealed and hence, it is possible to prevent a leakage of the decomposition gas G3 to the outside.

Further, the melting tank 12 includes the injection unit 51 capable of injecting the liquefied component Q4 of a low boiling point stored in the secondary storage tank 16 into the inside of the melting tank 12 like a shower.

By injecting the liquefied component Q4 from the injection unit 51, in this embodiment, by injecting gasoline into the inside of the melting tank 12 like a shower, the inside of the melting tank 12 can be cooled and, at the same time, it is possible to clean a melted residue adhering to the melting tank 12 and a residue (valuable materials) obtained by melting the solar battery panels 40 and being separated from the solar battery panels 40. The liquefied component Q4 is a part of the decomposition gas G0, and the product can be effectively used without introducing a cleaning liquid from the outside. The liquefied component Q4 injected into the inside of the melting tank 12 is returned to the primary decomposition tank 10 through the connecting pipe 46 after cleaning. A recovery opening 78 through which the liquefied component Q4 is recovered is formed in a lower portion of the melting tank 12.

Further, the door 42 has the duplicate structure that forms a space 43 therein. The melting tank 12 includes a nitrogen gas supply unit 44 for supplying a nitrogen gas into the space 43, and the space 43 is maintained at a pressure higher than an atmospheric pressure by the nitrogen gas during a period that the melting tank 12 is operated.

The door 42 is opened or closed and hence, it is difficult to mount the heater 68 on the door 42. Accordingly, it is possible to increase heat insulation property by filling a nitrogen gas into the space 43 of the door 42. Since the inside of the space 43 is controlled to a pressure higher than an atmospheric pressure, it is possible to prevent air from entering the inside of the melting tank 12 through the space 43.

Further, the melting tank 12 is configured such that a cooled nitrogen gas from a nitrogen gas supply unit 44 can be injected into the inside of the melting tank after the operation of the melting tank 12 is stopped.

The cooled nitrogen gas is injected into the inside of the melting tank 12 through the hole portion 54 formed in the door 42. Alternatively, a nitrogen gas is directly injected into the inside of the melting tank 12. Immediately after the operation of the melting tank 12 is stopped, the melting tank 12 is in a high temperature state. Accordingly, by injecting a cooled nitrogen gas into the inside of the melting tank 12 from the nitrogen gas supply unit 44 through the hole portion 54 formed in the door 42 or directly, it is possible to speedily cool a residue on the melting tank 12, the support plate 41 and the solar battery panels 40. By performing such an operation, a time for recovering valuable materials and a stand-by time for introducing the solar battery panels 40 that are target of the next treatment can be shortened.

Further, the meshed support plate 60 for separating the valuable materials and the molten plastic P2 that form the solar battery panels 40 from each other, the meshed support plate 60 and the solar battery panels 40 can be placed on the support plate 41, and the support plate 41 has a lattice-like support plate 61 that has a plurality of through holes.

The meshed support plate 60 can separate the valuable materials and the molten plastic P2 from each other, and the lattice-like support plate 61 can make the molten plastic P2 easily fall down. By adopting such a configuration, the recovery of the valuable materials can be easily performed.

Further, the support plate 41 includes the racks 62 that allow the solar battery panels 40 disposed adjacently to each other to be arranged with the gap 63 formed between the solar battery panels 40 in the melting tank 12.

In a case where the solar battery panels 40 disposed adjacently to each other are brought into a close contact state, heat transfer efficiency of each solar battery panel 40 is worsened and hence, a melting speed of the plastic material becomes slow. Accordingly, by forming the gap 63 between the solar battery panels 40 disposed adjacently to each other, it is possible to bring the decomposition gas G0 into contact with the periphery of each solar battery panel 40 and hence, a melting speed of the plastic materials that form the solar battery panels 40 can be increased. By forming the racks 62 such that the solar battery panels 40 are disposed laterally, it is possible to arrange the solar battery panels 40 in a laterally stacked manner. In a case where the solar battery panels 40 are arranged laterally, there is a possibility that the molten plastic P2 falls down from the solar battery panel 40 disposed at an upper side and hence, it is desirable to set the size of the gap 63 larger than the corresponding size of the gap 63 in the vertical arrangement.

Further, the support plate 41 is configured such that the support plate 41 is movable in the inside of the melting tank 12 while mounting the solar battery panels 40 thereon, and can be moved to the position where the residue (valuable materials) of the solar battery panels 40 can be recovered after thermal decomposition of the solar battery panels 40.

The support plate 41 is configured such that the support plate 41 is conveyed to the inside of the melting tank 12 in a state where the solar battery panels 40 are arranged, and the residue of the solar battery panels 40 after thermal decomposition can be taken out to the outside from the melting tank 12 together with the support plate 41. By adopting such a configuration, the solar battery panels 40 can be easily and speedily conveyed into the inside of the melting tank 12. On the other hand, the recovery of the valuable materials can be performed outside the melting tank 12 and hence, the recovery operation can be performed easily. Further, cleaning of the support plate 41 after the recovery operation can be performed easily.

Second Embodiment

Figure 5:
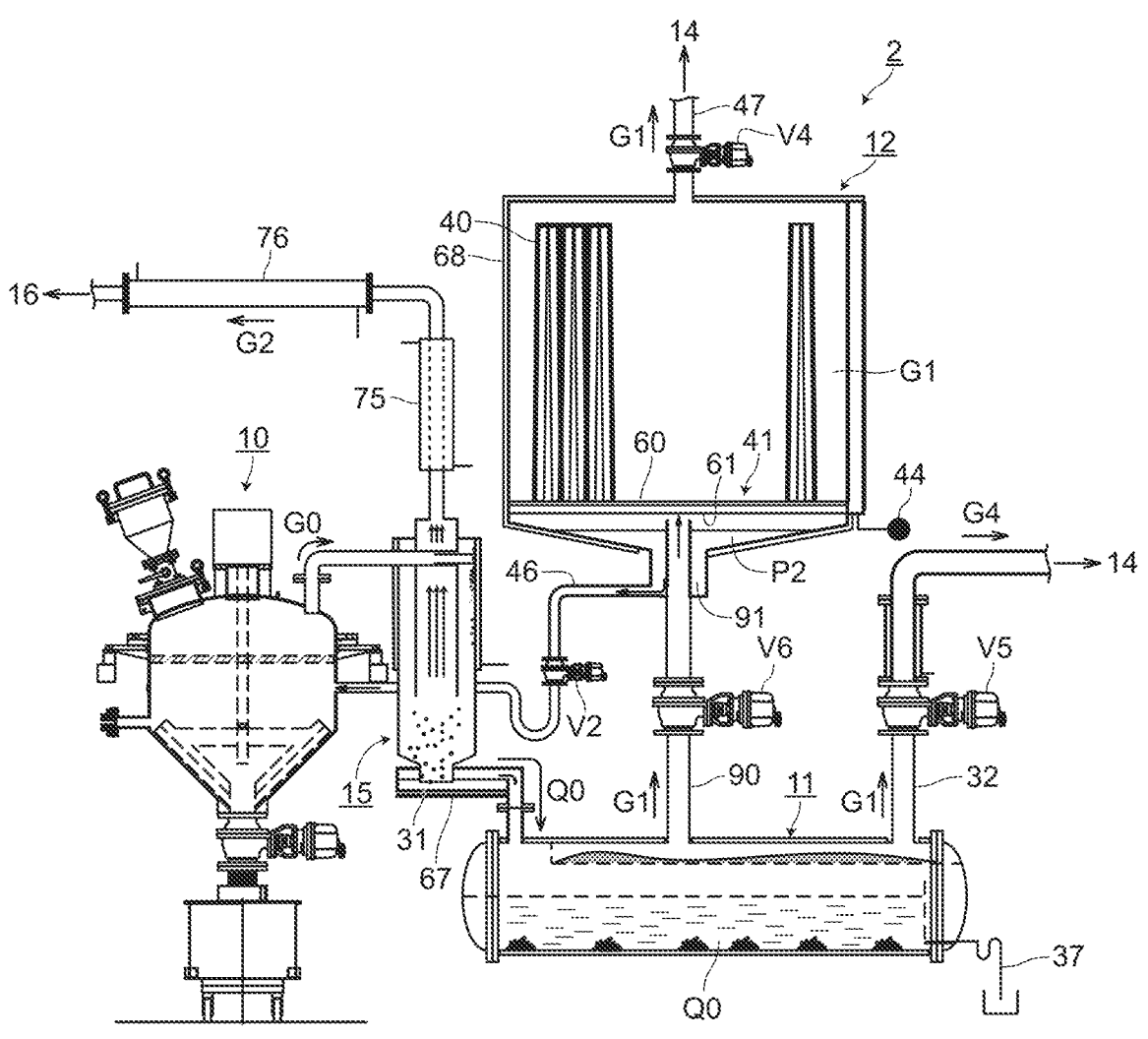
FIG. 5 is a configurational explanatory view illustrating a part of the configuration of a waste-plastic oil conversion device 2.

In the oil conversion device 1 described above, the decomposition gas G0 generated in the primary decomposition tank 10 is introduced into the melting tank 12. An oil conversion device 2 according to the second embodiment differs from the oil conversion device 1 described above with respect to a point that a low boiling point decomposition gas G1 generated by a secondary decomposition tank 11 is introduced into a melting tank 12. The configurations that make the oil conversion device 2 differ from the conversion device 1 are described hereinafter. In FIG. 5, the constitutional elements equal to the corresponding constitutional elements of the oil conversion device 1 are given with the same symbols used in FIG. 1 to FIG. 4. The oil conversion device 2 is described also with reference to FIG. 1.

FIG. 5 is a configurational explanatory view illustrating a part of the configuration of the oil conversion device 2. In the same manner as the oil conversion device 1, the secondary decomposition tank 11 is connected to a separation tower 15 by a connecting pipe 31, and is connected to a first storage tank 14 by a connecting pipe 32. Further, in the oil conversion device 2, the secondary decomposition tank 11 is connected to the melting tank 12 by a connecting pipe 90. The configuration of a separation tower 15, the configuration of a first storage tank 14, a path of the decomposition gas G0 between the secondary decomposition tank 11 and the separation tower 15, and paths of a low boiling point decomposition gas G1 and a decomposition gas G4 between the secondary decomposition tank 11 and the first storage tank 14 are equal to the corresponding constitutional elements in the oil conversion device 1 and hence, the description of these constitutional elements is omitted. A valve V5 is disposed on the connecting pipe 32.

An opening portion 91 is formed in a bottom portion of the melting tank 12, a connecting pipe 90 passes through the opening portion 91, and an upper distal end portion of the connecting pipe 90 extends to a position just close to a lower portion of a support plate 41. The low boiling point decomposition gas G1 generated in the secondary decomposition tank 11 is supplied to the periphery of solar battery panels 40 through meshes of a lattice-like support plate 61 and a meshed support plate 60, and heats the solar battery panels 40. A cross-sectional area of the opening portion 91 is set twice or more as large as a cross-sectional area of the connecting pipe 90 and hence, the flow of molten plastic P2 is not obstructed by the connecting pipe 90. A valve V6 is disposed on the connecting pipe 90. The opening portion 91 communicates with a connecting pipe 46, and the connecting pipe 46 is connected to the primary decomposition tank 10. Molten plastic P2 melted by the melting tank 12 flows through the connecting pipe 46 and is introduced into the primary decomposition tank 10.

A low boiling point decomposition gas G1 having a temperature that falls within a range of from 300° C. to 400° C. is introduced into the melting tank 12 from the secondary decomposition tank 11. Plastic materials such as a filler 81, a back sheet 84 and a sealing material 88 that form the solar battery panels 40 are melted by the low boiling point decomposition gas G1. In the melting tank 12, the low boiling point decomposition gas G1 that is generated when the plastic materials are melted and the low boiling point decomposition gas G1 that is introduced from the secondary decomposition tank 11 exist in mixture. The low boiling point decomposition gas G1 generated by the melting tank 12 passes through the connecting pipe 47 and is cooled by a temperature adjustment unit 29 and a cooling unit 38, and is condensed by the first storage tank 14 and is stored in the first storage tank 14 as a liquefied component Q1. The liquefied component Q1 is mainly a light oil component. In a case where an amount of the low boiling point decomposition gas G1 supplied to the melting tank 12 is not sufficient, the valve V5 is closed, and the whole low boiling point decomposition gas G1 generated by the secondary decomposition tank 11 is supplied to the melting tank 12. In a case where there is a surplus with respect to an amount of the low boiling point decomposition gas G1 supplied to the melting tank 12, the valve V5 can be released. The temperature of the low boiling point decomposition gas G1 falls within a range of from 300° C. to 400° C. and hence, the temperature is a temperature sufficient for melting the plastic materials. However, by further heating the melting tank 12 to a temperature that falls within a range of from 400° C. to 500° C. by a heater 68, a melting speed can be accelerated. At this point of time, a decomposition gas G3 is generated in the melting tank 12.

In the oil conversion device 2 described above, the secondary decomposition tank 11 is connected to the melting tank 12, and the low boiling point decomposition gas G1 generated in the secondary decomposition tank 11 is introduced into the melting tank 12. The oil conversion device 2 having such a configuration can, by introducing the low boiling point decomposition gas G1 generated in the secondary decomposition tank 11 and having a temperature that falls within a range of from 300° C. to 400° C., make use of the low boiling point decomposition gas G1 as heat energy for melting the solar battery panels 40. Accordingly, the oil conversion device 2 can, while reducing energy consumption, melt the plastic materials that form the solar battery panels 40, and separate the plastic materials into molten plastic P2 and valuable materials and recover the valuable materials and the liquefied component Q1 that is a useful generated oil.

Third Embodiment

Figure 6:
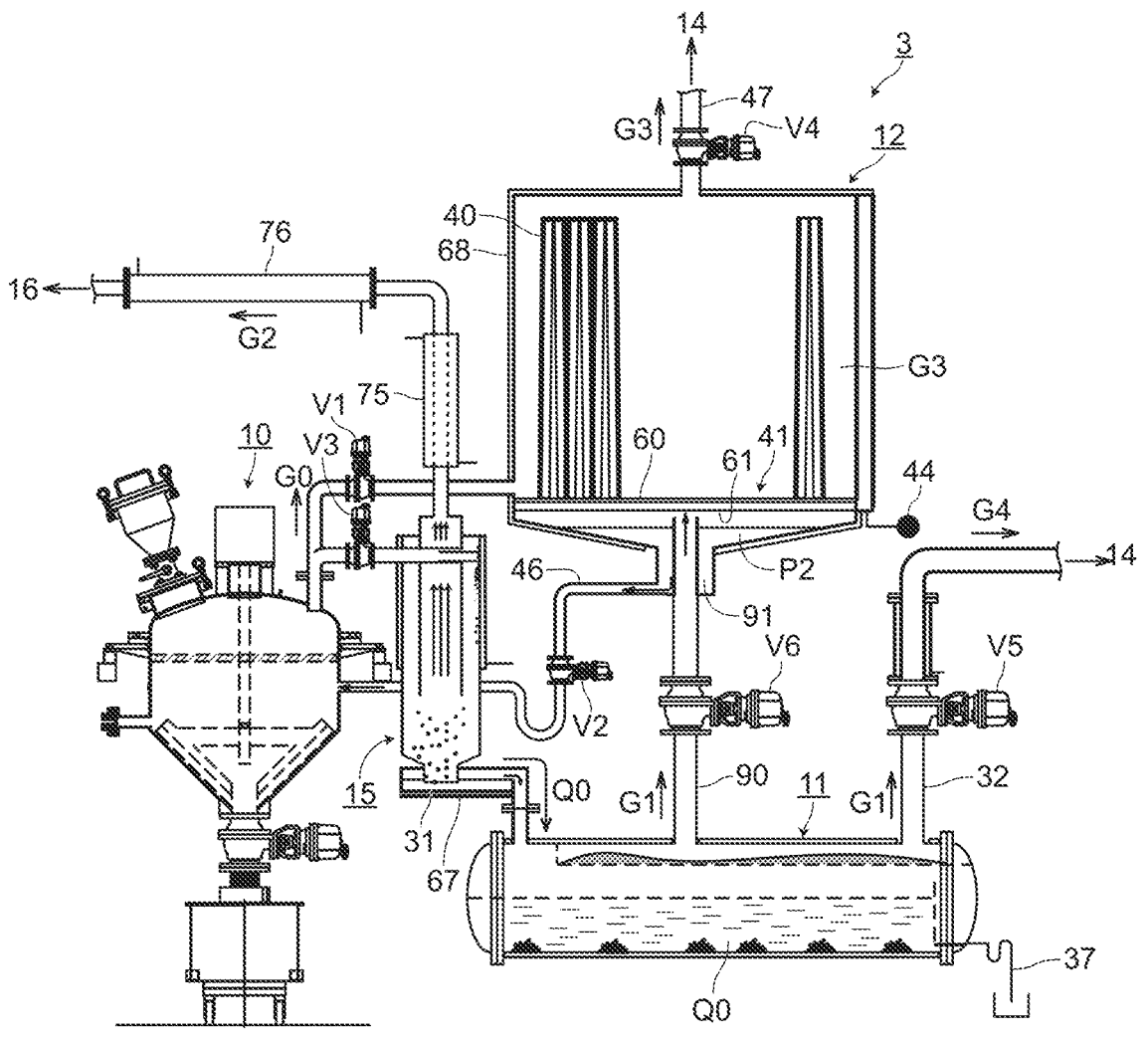
FIG. 6 is a configurational explanatory view illustrating a part of the configuration of a waste-plastic oil conversion device 3.

In the oil conversion device 1 described above, the decomposition gas G0 generated in the primary decomposition tank 10 is introduced into the melting tank 12. Further, in the oil conversion device 2, the low boiling point decomposition gas G1 generated by the secondary decomposition tank 11 is introduced into the oil conversion device 2. An oil conversion device 3 according to the third embodiment differs from the oil conversion device 1 and the oil conversion device 2 with respect to a point that a decomposition gas G0 generated in a primary decomposition tank 10 and a low boiling point decomposition gas G1 generated in a secondary decomposition tank 11 are introduced into a melting tank 12. Constitutional elements that make the oil conversion device 3 differ from the oil conversion devices 1, 2 are described. In FIG. 6, constitutional elements that are equal to the corresponding constitutional elements in the oil conversion devices 1, 2 are given with the same symbols used in FIG. 1 to FIG. 5. The oil conversion device 3 is described also with reference to FIG. 1 and FIG. 5.

FIG. 6 is a configurational explanatory view illustrating a part of the configuration of the oil conversion device 3. The oil conversion device 3 can introduce a decomposition gas G0 generated by the primary decomposition tank 10 into the melting tank 12 in the same manner as the oil conversion device 1. Further, the oil conversion device 3 is configured to introduce a low boiling point decomposition gas G1 generated by the secondary decomposition tank 11 into the melting tank 12 in the same manner as the oil conversion device 2. That is, the oil conversion device 3 is configured to introduce the decomposition gas G0 and the low boiling point decomposition gas G1 into the melting tank 12. In this case, in the same manner as the oil conversion device 1, a decomposition gas G3 is generated in the melting tank 12, and a liquefied component Q2 is stored in a first storage tank 14.

The oil conversion device 3 allows the melting tank 12 to switch a gas introduction mode between the introduction of the decomposition gas G0 from the primary decomposition tank 10 into melting tank 12 and the introduction of a low boiling point decomposition gas G1 into the melting tank 12 from the secondary decomposition tank 11.

In a case where only the decomposition gas G0 is introduced into the melting tank 12, valves V1, V2, V4 are released, and a valve V3 is closed. In such a case, the decomposition gas generation action by the oil conversion device 3 is equal to the decomposition gas generation action by the oil conversion device 1, wherein the decomposition gas G3 is generated in the melting tank 12, and a liquefied component Q2 is stored in a first storage tank 14. In a case where only the low boiling point decomposition gas G1 is introduced into the melting tank 12, valves V1, V5 are closed, and the valves V3, V4, V6 are released. In such a case, the decomposition gas generation action by the oil conversion device 3 is equal to the decomposition gas generation action by the oil conversion device 2, wherein the low boiling point decomposition gas G1 is generated in the melting tank 12, and a liquefied component Q1 is stored in the first storage tank 14.

In the oil conversion device 3, for example, in a case where each solar battery panel 40 is large in size or the number of the solar battery panels 40 is large, the decomposition gas G0 of a high temperature is introduced into the melting tank 12. In a case where each solar battery panel 40 is small in size or the number of the solar battery panels 40 is small, the low boiling point decomposition gas G1 is introduced into the melting tank 12. The oil conversion device 3 can switch the gas introduction mode depending on an operation state of the oil conversation device 3.

According to the oil conversion device 3 that has the above-mentioned configuration, it is possible to switch an operation mode between the mode where the decomposition gas G0 that is generated in the primary decomposition tank 10 is introduced into the melting tank 12 thus melting the plastic materials of the solar battery panels 40 in the same manner as the oil conversion device 1, and the mode where the low boiling point decomposition gas G1 that is generated in the secondary decomposition tank 11 is introduced into the melting tank 12 thus melting the plastic materials of the solar battery panels 40 in the same manner as the oil conversion device 2 depending on an amount of the solar battery panels 40 or the size of the solar battery panel 40.

In the first, second and third embodiments described above, the description has been made with respect to the case where the solar battery panels 40 are introduced into the melting tank 12. However, what can be introduced into the melting tank 12 is not limited to the solar battery panels 40, and large-sized waste plastics P0 that cannot be introduced into the primary decomposition tank 10 (for example, pallets or containers for transporting commodities that can be crushed only with the use of a large-sized crusher, these being referred to as waste plastic P3 hereinafter) can be introduced into the melting tank 12. It is needless to say that the waste plastic P0 that can be introduced into the primary decomposition tank 10 can be also introduced into the melting tank 12. The melting tank 12 is connected to either one of the primary decomposition tank 10 or the secondary decomposition tank 11 so that the decomposition gas G0 or the low boiling point decomposition gas G1 can be introduced. That is, the present invention can select any one of the oil conversion device 1 (see FIG. 1), the oil conversion device 2 (see FIG. 5), and the oil conversion device 3 (see FIG. 6).

Melting of waste plastic P3, the generation of the decomposition gas G0 and the recovery of the liquefied component Q2 can be described in the same manner as the description of the oil conversion devices 1. 2, 3. In a case where waste plastic P3 contains foreign substances such as metal pieces, the foreign substances can be separated from molten plastic P2 by the meshed support plate 60 (see FIG. 2A and FIG. 2B). Accordingly, with the use of the primary decomposition tank 10 and the melting tank 12, small-piece waste plastic P0 and large-sized waste plastic P3 are melted and hence, the generation of the decomposition gases G0, G2, the generation of the low boiling point gas G1, the recovery of the liquefied components Q1, Q2, Q3, Q4 and the like that form oil components, and the separation and recovery of valuable materials and foreign substances can be performed.

The invention claimed is:

1. A waste-plastic oil conversion device comprising:
   a primary decomposition tank that generates a first decomposition gas by melting waste plastic at a first temperature;
   a secondary decomposition tank that generates a second decomposition gas with boiling point lower than that of the first decomposition gas by heating a liquefied component generated by condensing a component with boiling point higher than that of other components out of the first decomposition gas generated by the primary decomposition tank at a second temperature lower than the first temperature;
   a melting tank that melts plastic materials contained in a solar battery panel so as to separate the plastic material into the plastic material and a residue left after all of the plastic materials contained in the solar battery panel are melted; and
   a first storage tank that condenses and stores the first decomposition gas and the second decomposition gas therein, wherein
   the melting tank is connected to at least one of the primary decomposition tank or the secondary decomposition tank, and is configured to introduce the first decomposition gas or the second decomposition gas into the melting tank.

2. The waste-plastic oil conversion device according to claim 1: further comprising a separation tower that is disposed between the primary decomposition tank and the secondary decomposition tank, the separation tower configured to separate the first decomposition gas generated by the primary decomposition tank into a third decomposition gas introduced into a secondary storage tank and the liquefied component introduced into the secondary decomposition tank.

3. The waste-plastic oil conversion device according to claim 2, wherein the secondary decomposition tank includes a meshed partition wall that separates an inside of the secondary decomposition tank into a region that is connected to the separation tower and a region that is connected to at least one of the first storage tank or the melting tank, and a catalyst is disposed on a bottom portion on a lower side than the partition wall and on an upper surface of the partition wall.

4. The waste-plastic oil conversion device according to claim 2, wherein the melting tank includes an injection unit capable of injecting a liquefied component stored in the secondary storage tank into an inside of the melting tank.

5. The waste-plastic oil conversion device according to claim 1, wherein the melting tank includes:

a support plate capable of mounting the solar battery panel thereon;

a door capable of sealing the melting tank, and being openable and closeable so as to allow insertion and taking out of the solar battery panel into and from the melting tank; and a heater for maintaining the melting tank at a predetermined temperature.

6. The waste-plastic oil conversion device according to claim 5, wherein the door has a double wall structure with two walls defining a space between the two walls, the melting tank includes a nitrogen gas supply unit that supplies a nitrogen gas into the space, and the space is maintained at a pressure higher than an atmospheric pressure by the nitrogen gas during an operation of the melting tank.

7. The waste-plastic oil conversion device according to claim 6, wherein the melting tank is configured to inject a cooled nitrogen gas into the melting tank from the nitrogen gas supply unit after an operation of the melting tank is finished.

8. The waste-plastic oil conversion device according to claim 5, wherein the support plate includes:

a meshed support plate that separates the residue from the solar battery panel and a molten plastic material; and a lattice-like support plate capable of mounting the meshed support plate and the solar battery panel thereon and having a plurality of through holes.

9. The waste-plastic oil conversion device according to claim 5, wherein the support plate further includes a rack capable of arranging solar battery panels disposed adjacently to each other in a state where a gap is formed between the solar battery panels in an inside of the melting tank.

10. The waste-plastic oil conversion device according to claim 5, wherein the support plate is configured to mount the solar battery panel thereon, is configured to move in an inside of the melting tank, and is configured to move the residue of the solar battery panel to a position where the residue is recovered after thermal decomposition of the solar battery panel.

11. The waste-plastic oil conversion device according to claim 1, wherein the melting tank is configured to allow introducing of the waste plastic having a size that cannot be introduced to the first decomposition tank.

\* \* \* \* \*